United States Patent
Wagner et al.

(10) Patent No.: US 12,084,027 B2
(45) Date of Patent: Sep. 10, 2024

(54) METHOD FOR CONTROLLING AN ELECTRONICALLY SLIP-CONTROLLABLE POWER BRAKING SYSTEM AND ELECTRONICALLY SLIP-CONTROLLABLE POWER BRAKING SYSTEM

(71) Applicant: Robert Bosch GmbH, Stuttgart (DE)

(72) Inventors: Jens Wagner, Untergruppenbach (DE); Bertram Foitzik, Ilsfeld (DE); Stefan Zahariev, Ilsfeld (DE)

(73) Assignee: ROBERT BOSCH GMBH, Stuttgart (DE)

( * ) Notice: Subject to any disclaimer, the term of this patent is extended or adjusted under 35 U.S.C. 154(b) by 832 days.

(21) Appl. No.: 16/522,203

(22) Filed: Jul. 25, 2019

(65) Prior Publication Data
US 2020/0047728 A1    Feb. 13, 2020

(30) Foreign Application Priority Data
Aug. 8, 2018   (DE) .......................... 102018213318.2

(51) Int. Cl.
*B60T 17/22*    (2006.01)
*B60T 8/1761*    (2006.01)
(Continued)

(52) U.S. Cl.
CPC .......... *B60T 8/1761* (2013.01); *B60T 8/4081* (2013.01); *B60T 13/662* (2013.01); *B60T 13/686* (2013.01)

(58) Field of Classification Search
CPC ........ B60T 8/50; B60T 8/5087; B60T 8/3265; B60T 13/662; B60T 13/745; B60T 8/404;
(Continued)

(56) References Cited

U.S. PATENT DOCUMENTS

| 6,807,848 B1 * | 10/2004 | Fennel | .................... B60T 8/404 |
|---|---|---|---|
| | | | 374/E7.018 |
| 2003/0160505 A1 * | 8/2003 | Riddiford | ............... B60T 8/326 |
| | | | 303/115.2 |

(Continued)

FOREIGN PATENT DOCUMENTS

| CN | 104249721 A | 12/2014 |
|---|---|---|
| CN | 107618492 A | 1/2018 |

(Continued)

*Primary Examiner* — Nicholas J Lane
*Assistant Examiner* — Stephen M Bowes
(74) *Attorney, Agent, or Firm* — NORTON ROSE FULBRIGHT US LLP; Gerard A. Messina

(57) ABSTRACT

A method for controlling an electronically slip-controllable power braking system and a braking system. This power braking system has a brake circuit and a pressure generator including a plunger piston for applying a circuit pressure to the brake circuit. The plunger piston delimits a pressure chamber of the pressure generator and is drivable by an activatable drive unit into a forward or reverse movement. During its forward movement, pressure medium is displaced by the plunger piston out of the pressure chamber into the brake circuit, while during the reverse movement, pressure medium flows out of a reservoir of the power braking system via a flow path into the pressure chamber of the pressure generator. The speed of the reverse movement of the plunger piston is adapted by the electronic control unit so that cavitation at the pressure generator of the power braking system, is avoided or at least minimized.

20 Claims, 2 Drawing Sheets

(51) Int. Cl.
*B60T 8/40* (2006.01)
*B60T 13/66* (2006.01)
*B60T 13/68* (2006.01)

(58) Field of Classification Search
CPC .... B60T 8/4059; B60T 8/4081; B60T 13/686;
F15B 7/08; F15B 21/006
USPC ........................................................... 92/12
See application file for complete search history.

(56) References Cited

U.S. PATENT DOCUMENTS

| | | | | |
|---|---|---|---|---|
| 2005/0279593 | A1* | 12/2005 | Uphues | F03D 7/0248 188/170 |
| 2008/0238186 | A1* | 10/2008 | Suzuki | B60T 13/686 303/20 |
| 2009/0301073 | A1* | 12/2009 | Mueller | B60T 1/10 60/413 |
| 2014/0225425 | A1 | 8/2014 | Drumm et al. | |
| 2017/0114807 | A1* | 4/2017 | Afshari | F15B 11/10 |
| 2019/0023246 | A1* | 1/2019 | Wagner | B60T 8/17 |
| 2019/0299962 | A1* | 10/2019 | Leiber | B60T 8/4072 |

FOREIGN PATENT DOCUMENTS

| | | | | |
|---|---|---|---|---|
| CN | 108349463 | A | 7/2018 | |
| DE | 102013205639 | A1 | 10/2014 | |
| DE | 102013020553 | A1 * | 5/2015 | ............ B60T 13/146 |
| DE | 102015222468 | A1 * | 5/2017 | ............ B60T 13/146 |
| DE | 102016208564 | A1 * | 11/2017 | |
| DE | 102016112971 | A1 * | 1/2018 | ............ B60T 17/222 |

* cited by examiner

METHOD FOR CONTROLLING AN ELECTRONICALLY SLIP-CONTROLLABLE POWER BRAKING SYSTEM AND ELECTRONICALLY SLIP-CONTROLLABLE POWER BRAKING SYSTEM

CROSS REFERENCE

The present application claims the benefit under 35 U.S.C. § 119 of German Patent Application No. DE 102018213318.2 filed on Aug. 8, 2018, which is expressly incorporated herein by reference.

FIELD

The present invention relates to a method for controlling an electronically slip-controllable power braking system, and an electronically slip-controllable power braking system.

BACKGROUND INFORMATION

An electronically slip-controllable power braking system on which the present invention is based is described in German Patent Application No. DE 10 2013 205 639 A1 (Bauer), in particular FIG. 1 of Bauer.

This conventional power braking system is equipped with a pressure generator in the form of a plunger device, which includes a drivable plunger piston, which, together with a plunger cylinder, delimits a pressure chamber changeable in its volume. The plunger device is provided for applying a circuit pressure to each of two brake circuits separated from one another. The brake circuits may be decoupled with the aid of disconnection valves from an additionally provided simulator circuit, so that an independent displacement of pressure medium with the aid of a master brake cylinder of the power braking system or by the plunger piston into the wheel brakes connected to the brake circuits is possible. A wheel-specific pressure control is carried out by an electronic activation of inlet and outlet valves, which are each associated in pairs with each wheel brake. Wheel-specific pressure controls take place as needed when the power braking system operates in the antilock braking system mode (ABS), in the anti-slip regulation mode (ASR), or in the electronic stability program mode (ESP).

To reduce a brake pressure in a wheel brake, the particular associated inlet valve is closed and pressure medium is discharged from the wheel brake via the associated outlet valve into a reservoir of the power braking system. Discharged pressure medium is therefore no longer available for subsequent pressure buildups by the plunger piston. The finite volume of the plunger device is thus successively consumed by multiple pressure buildups and reductions. A supplementation of the pressure medium volume in the plunger device is therefore required from time to time. This takes place, for example, via valves, which disconnect the plunger device from the system, and by a movement of the plunger piston in the reverse direction or pressure reduction direction. A partial vacuum in relation to the atmospheric pressure which thus results in the pressure chamber of the plunger device opens a check valve in a flow path from the reservoir of the power braking system to the pressure chamber of the plunger device and pressure medium from the reservoir flows into the pressure chamber. However, the plunger device is not available for pressure buildups in the system for the duration of the volume supplementation.

So as not to impair the vehicle stability and the vehicle deceleration due to the volume supplementation procedure, this procedure therefore has to take place in a very short time. Because of this, the plunger piston is moved at very high speeds. In the case of reduced ambient temperatures, in particular in combination with a reduced atmospheric pressure, cavitation may thus occur in the pressure chamber of the plunger device. Occurring cavitation is undesirable, since it may damage the components participating in the pressure generation, lengthens the duration for the volume supplementation, and reduces the volume of pressure medium accommodated in the pressure chamber.

In addition to the viscosity of the pressure medium, the flow resistance of the flow path is significant for the occurrence of cavitation effects during a volume supplementation procedure. The viscosity of the pressure medium typically increases continuously in a temperature range less than 0° C. with increasing distance from this 0° boundary.

SUMMARY

An example method according to the present invention and an example electronically slip-controllable power braking system according to the present invention may have the advantage that cavitation effects are avoided or at least minimized.

According to the present invention, the speed of the plunger piston in the reverse direction or pressure reduction direction is adapted for this purpose by the electronic control unit of the power braking system in such a way that cavitation does not occur or cavitation is at least minimized. In one particularly advantageous refinement of the present invention, the adaptation of the speed takes place as a function of provided information on the prevailing viscosity of the pressure medium. In one refinement of the present invention, the prevailing viscosity of the pressure medium is derived from temperature information provided in the electronic control unit, but alternatively thereto may also be estimated in the scope of a model-based determination.

With falling temperature and an increase of the viscosity of the pressure medium linked thereto, the speed at which the plunger piston of the plunger device is driven by the drive unit in the reverse, i.e., pressure-reducing direction during a volume supplementation procedure is ultimately reduced. For this purpose, the electronic control unit of the power braking system applies a reduced current strength to the drive unit of the plunger device, and the drive unit accordingly rotates slower and accordingly drives the plunger piston slower.

The provision of an activation signal to the drive unit by the electronic control unit may additionally be based on the flow resistance of the flow path, in addition to the viscosity of the pressure medium. Both the viscosity change of the pressure medium and also the change of the flow resistance of the flow path as a function of the temperature are known from preceding studies and stored in the electronic control unit.

The prevailing viscosity and the prevailing flow resistance of the flow path are accordingly determinable sufficiently accurately in real time and the provision of an activation signal to the drive unit of the plunger device may be based thereon. The electronic control unit is accordingly equipped with a so-called electronic viscosity determination device to avoid or at least minimize cavitation.

The temperature information may be derived, for example, by way of a measurement of the temperature of the pressure medium in the power braking system or alternatively by way of the measurement of the temperature of a housing section of a hydraulic assembly of the power braking system, preferably a housing section on which the flow path from the reservoir to the pressure generator is formed.

A further optimization of the method [sic; movement] speed of the plunger piston during a volume supplementation procedure may be achieved if, in addition to the temperature information, information about the prevailing atmospheric pressure is taken into consideration. The flow resistance of the flow path may be determined extremely accurately from the pressure difference between the atmospheric pressure and the pressure in the pressure chamber of the plunger device in conjunction with the provided temperature information.

Due to a reduction of the drive speed of the plunger piston, inevitably a reduced volume of pressure medium flows into the pressure chamber of the plunger device per unit of time. In one advantageous refinement of the present invention, the duration of a reverse actuation of the plunger piston is therefore adapted to the reduced speed by the electronic control unit in such a way that, independently of this speed, the volume of pressure medium accommodated by the plunger device is always the same. The actuation duration of the plunger piston accordingly increases with decreasing speed of the plunger piston.

Further advantages or advantageous refinements of the present invention also result from the following description.

BRIEF DESCRIPTION OF THE DRAWINGS

The present invention will be explained in greater detail hereafter on the basis of the figures.

FIG. 4 shows a volume supplementation procedure carried out according to the present invention, i.e., with reduced plunger speed in the reverse direction or pressure reduction direction and with at least minimized cavitation.

DETAILED DESCRIPTION OF EXAMPLE EMBODIMENTS

Figure 1:
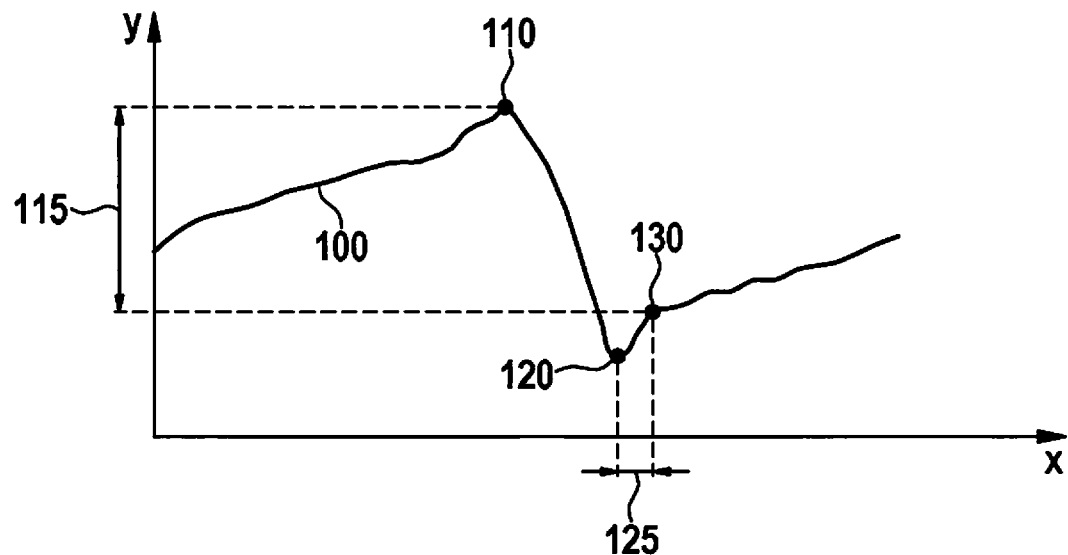
FIGS. 1, 2, and 4 show diagrams recorded chronologically synchronously, which each show a reverse movement of the plunger piston, i.e., a volume supplementation procedure of the pressure generator. No cavitation effects occur in the diagram according to FIG. 1, while in comparison thereto, a volume supplementation procedure is shown in FIG. 2 in which cavitation occurs.

In FIG. 1, rotational angle 100 of a driveshaft of a drive motor of a plunger device (Y axis) is plotted over the time (X axis). The rotational angle of this driveshaft is converted by a transmission downstream from the drive motor into a translational movement of the plunger piston and is thus directly proportional to a distance covered by the plunger piston in a plunger cylinder.

At point 110 of profile curve 100 according to FIG. 1, the plunger piston has reached a first reversal position and the hitherto existing forward movement of the plunger piston (pressure buildup direction) is reversed by a change of the rotational direction of the drive motor by the electronic control unit. The plunger piston moves in reverse from now on, i.e., in the pressure reduction direction. During this reverse movement, the volume of a pressure chamber of a plunger device delimited by the plunger piston increases and a partial vacuum builds up in this pressure chamber. The latter has the effect that pressure medium flows from a reservoir of a vehicle braking system via a valve-controlled flow path into the pressure chamber and replaces the pressure medium previously displaced by the plunger piston, which is then available for pressure buildups of the plunger device during subsequent braking procedures. During a reverse movement of the plunger piston, the pressure medium volume present in the plunger device increases continuously.

At point 120, the plunger piston has reached its second reversal position. The movement direction of the plunger piston is changed once again by a further reversal of the rotational direction of the drive motor, now from the hitherto existing reverse movement or pressure reduction direction into the forward direction or pressure buildup direction. The plunger piston reduces the volume of the pressure chamber until the plunger piston applies a specific pressure to the pressure medium present in the pressure chamber in position 130. A drainage of pressure medium out of the pressure chamber is prevented by the control valves in the flow path, which assume their blocking position with the reversal of the movement direction of the plunger piston.

A distance 115 covered by the plunger piston between points 110 and 130 may be read off directly on the Y axis of the diagram because of the above-described proportionality between rotational angle of the driveshaft of the drive motor and the translational movement of the plunger piston. Duration 125 which has elapsed until the buildup of the pressure in the pressure medium, may also be read on the X axis of the diagram between points 120 and 130. Since no cavitation effects have occurred during the recording of the diagram according to FIG. 1, as explained, this duration 125 for the pressure buildup is relatively short, as is distance 115 covered by the plunger piston, and the volume of pressure medium accommodated in the pressure chamber is thus comparatively large.

Figure 2:
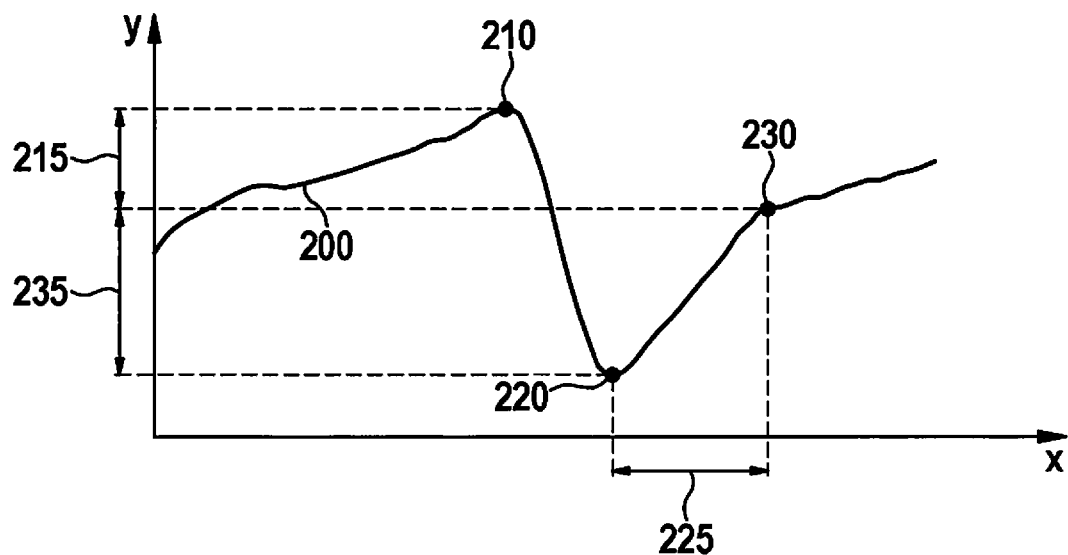

These conditions change as soon as cavitation occurs during the performed volume supplementation. The diagram according to FIG. 2 shows such a profile.

As a result of cavitation, gas exits from the pressure medium, which prevents an immediate pressure buildup because of its compressibility. As may be read on the X axis of the diagram according to FIG. 2, a period of time 225 therefore passes between points 220 and 230 of profile curve 200, which is significantly longer than period of time 125 according to FIG. 1, until the desired pressure prevails in the pressure medium.

To reach this pressure, the plunger piston moreover has to cover a correspondingly greater distance 235 in the pressure buildup direction. As a result, points 210 and 230 of the profile curve also move closer together on the Y axis of the diagram and the volume of pressure medium accommodated by the pressure chamber, readable at distance 215, is correspondingly less.

Less volume of pressure medium in the pressure chamber permits fewer subsequent braking procedures to be carried out or requires a shorter time interval until a further volume supplementation has to be carried out by the plunger device.

Since the plunger device is not available for a brake pressure adaptation to the braking intention or to the braking situation during a volume supplementation, it is desirable to avoid or at least minimize cavitation.

The present invention achieves this object by way of an adaptation of the speed of the reverse movement or the movement in the pressure reduction direction of the plunger piston.

In one advantageous embodiment of the present invention, for this purpose a determination of the speed of the reverse movement by the electronic control unit of the power braking system is based on information about the viscosity of the pressure medium. The viscosity of the pressure medium may be derived by computation, for example, from information about the temperature of the pressure medium or about the temperature of a housing block of a power braking system, preferably in the region of the flow path from the reservoir to the pressure chamber. Alternatively, it would be possible to estimate the viscosity based on a model.

Figure 3:
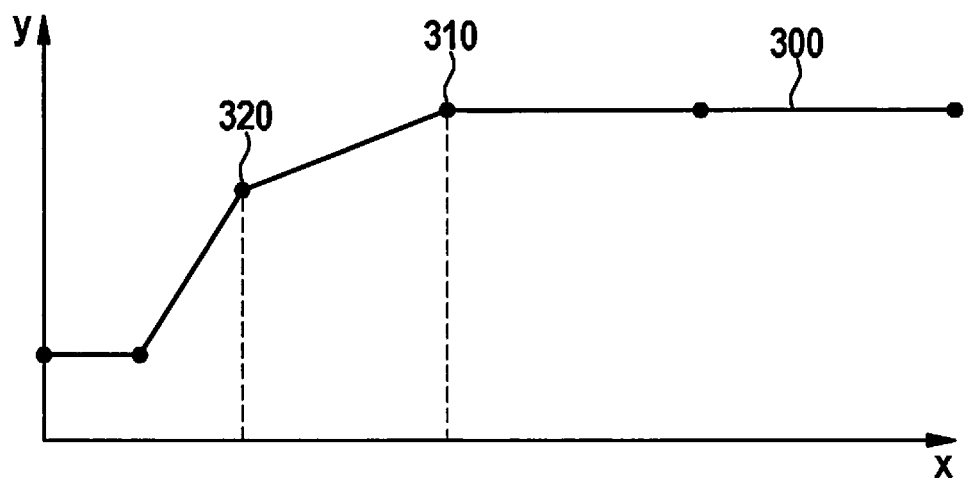
FIG. 3 shows the profile of a maximum speed of the plunger piston movement, during which no cavitation occurs, over the temperature.

In this context, FIG. 3 shows a diagram which records a maximum speed of the reverse movement of the plunger piston up to which no cavitation occurs on the Y axis of profile curve 300 as a function of a temperature indicated on the X axis of this diagram. It may be inferred from this diagram that the speed maximum continuously decreases with increasing distance below position 310 (0° C. boundary) and even drops exponentially from position 320, which stands for approximately −20° C. The temperatures mentioned are to be understood solely as examples.

The determination of the speed of the reverse movement of the plunger piston may be made more precise if the flow resistance of the flow path is taken into consideration in addition to the viscosity of the pressure medium. This flow resistance is known from preceding studies of the power braking system. In addition, a further consideration of the atmospheric pressure during the determination of the speed of a reverse movement of the plunger piston is advantageous.

To ensure that a definable minimum volume of pressure medium enters the pressure chamber of the plunger device during each volume supplementation which is carried out and therefore to keep the number of required volume supplementations as low as possible, the duration of the reverse movement of the plunger piston may be adapted as a function of the ascertained reverse speed of the plunger piston in such a way that decreasing speeds of the plunger piston are compensated for by a correspondingly increasing actuation duration of the plunger piston.

The speed at which the plunger piston moves is defined, as described, by an electronic viscosity determination device of the electronic control unit of the power braking system. The electronic control unit sends a power signal to the drive motor of the plunger device as a result, which finally specifies the rotational direction and rotational velocity of the driveshaft of the drive motor. The latter is in turn converted by a transmission downstream of the drive motor using known transmission ratio into a translational movement and transmitted to the plunger piston of the plunger device.

Figure 4:
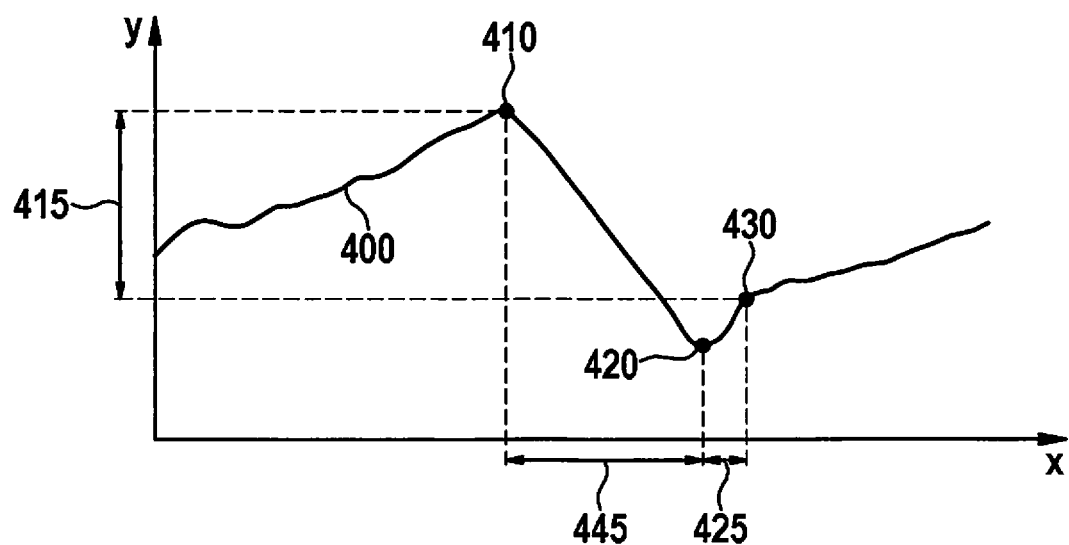

Finally, FIG. 4 shows a volume supplementation procedure of the plunger device which was carried out according to the method proposed according to the present invention, i.e., at reduced plunger speed in the reverse direction or pressure reduction direction and during which at most cavitation strongly limited in its extent has therefore taken place. Profile curve 400 of the plunger movement according to FIG. 4 differs from the diagrams according to FIG. 1 or according to FIG. 2 in that because of the reduced plunger speed, period of time 445 between the two reversal positions 410 and 420 of the plunger piston is longer, so that profile curve 400 extends comparatively flatter between these reversal points 410 and 420. Period of time 425 until a pressure buildup in the pressure chamber from second reversal point 420 of the plunger piston is at most slightly longer than in FIG. 1 (cavitation absent), but nonetheless significantly shorter than in FIG. 2 (cavitation present). In contrast, plunger piston stroke 415 and thus the volume of pressure medium supplemented in the pressure chamber of the plunger device is advantageously significantly greater than in the case of an occurring cavitation, according to FIG. 2.

Of course, additions or advantageous refinements which go beyond the explanations are possible, without deviating from the basic concept of the present invention.

What is claimed is:

1. A method for controlling an electronically slip-controllable power braking system including a brake circuit and a pressure generator configured to apply a circuit pressure to the brake circuit, the pressure generator including a plunger piston which delimits a pressure chamber changeable in volume and a drive unit, which is activatable by an electronic control unit of the power braking system, the drive unit being drivable at a forward speed into a forward movement, during which the plunger piston displaces pressure medium out of the pressure chamber into the brake circuit or at a reverse speed into a reverse movement oriented opposite to the forward movement, during which pressure medium flows via a flow path out of a reservoir of the power braking system into the pressure chamber of the pressure generator, the method comprising:

adapting, by the electronic control unit, the reverse speed of the plunger piston;

wherein at least one of the following (a)-(b):

(a) the method further comprises determining a current atmospheric pressure, determining a current pressure in the pressure chamber, and determining a difference between the determined current atmospheric pressure and the determined current pressure in the pressure chamber, and the adapting is performed based on the determined difference; and (b) the adapting includes:

determining, by the electronic control unit, a temperature;

selecting, by the electronic control unit and based on the determined temperature, a maximum value for the reverse speed, the selecting being performed in a manner by which:

(i) above a predefined temperature value, differences in the determined temperature do not cause a change to the selected maximum value;

(ii) within a first temperature range that extends negatively from the predefined temperature value, a reduction in the determined temperature causes a corresponding reduction to the selected maximum value at a first constant rate; and (iii) a reduction of the detected temperature within a second temperature range, which is below the first temperature range, causes a corresponding reduction to the selected maximum value at a second constant rate, the second constant rate being greater than the first constant rate; and based on the selecting of the maximum value, controlling, by the electronic control unit, the reverse speed of the plunger piston to remain below the selected maximum value.

2. The method for controlling the electronically slip-controllable power braking system as recited in claim 1, wherein the method comprises a step of determining, by the electronic control unit, a current flow resistance of the flow path, which is from the reservoir to the pressure chamber, and the adapting is performed by the electronic control unit and as another step that is performed subsequent to the determination of the current flow resistance and based on the determined current flow resistance.

3. The method for controlling the electronically slip-controllable power braking system as recited in claim 1, wherein the method comprises the determination of the current atmospheric pressure and of the current pressure in the pressure chamber, and the adapting is performed based on the determined difference.

4. The method for controlling the electronically slip-controllable power braking system as recited in claim 1, wherein a duration of the reverse movement of the plunger piston is adapted as a function of the ascertained reverse speed of the plunger piston in such a way that a pressure medium volume flowing into the pressure chamber is the same regardless of the value of the reverse speed that is selected.

5. The method for controlling the electronically slip-controllable power braking system as recited in claim 4, wherein:
the adapting includes:
the determining, by the electronic control unit, of the temperature;
the selecting, by the electronic control unit and based on the determined temperature, of the maximum value for the reverse speed, the selecting being performed in the manner by which:
(i) above the predefined temperature value, the differences in the detected temperature do not cause any change to the selected maximum value; and
(ii) within the first temperature range that extends negatively from the predefined temperature value, the reduction in the determined temperature causes the corresponding reduction to the selected maximum value at the first constant rate; and
the controlling, based on the selecting of the maximum value and by the electronic control unit, of the reverse speed of the plunger piston to be below the selected maximum value; and
the predefined temperature value is 0° C.

6. The method for controlling the electronically slip-controllable power braking system as recited in claim 1, wherein the adapting includes:
the determining, by the electronic control unit, of the temperature;
the selecting, by the electronic control unit and based on the determined temperature, of the maximum value for the reverse speed, the selecting being performed in the manner by which:
(i) above the predefined temperature value, the differences in the detected temperature do not cause any change to the selected maximum value; and
(ii) within the first temperature range that extends negatively from the predefined temperature value, the reduction in the determined temperature causes the corresponding reduction to the selected maximum value at the first constant rate; and
the controlling, based on the selecting of the maximum value and by the electronic control unit, of the reverse speed of the plunger piston to be below the selected maximum value.

7. The method for controlling the electronically slip-controllable power braking system as recited in claim 6, wherein the determined temperature is a detected temperature of the pressure medium.

8. The method for controlling the electronically slip-controllable power braking system as recited in claim 7, wherein the predefined temperature value is 0° C.

9. The method for controlling the electronically slip-controllable power braking system as recited in claim 6, wherein the selecting of the maximum value of the reverse speed is performed such that a reduction of the detected temperature within the second temperature range, which is below the first temperature range, causes the corresponding reduction to the selected maximum value at the second constant rate, the second constant rate being greater than the first constant rate.

10. The method for controlling the electronically slip-controllable power braking system as recited in claim 9, wherein the predefined temperature value is 0° C.

11. The method for controlling the electronically slip-controllable power braking system as recited in claim 6, wherein the determined temperature is a detected temperature of a housing section of a hydraulic assembly of the vehicle braking system forming the flow path.

12. The method for controlling the electronically slip-controllable power braking system as recited in claim 11, wherein the predefined temperature value is 0° C.

13. The method for controlling the electronically slip-controllable power braking system as recited in claim 6, wherein the determined temperature is estimated based on a model.

14. The method for controlling the electronically slip-controllable power braking system as recited in claim 13, wherein the predefined temperature value is 0° C.

15. The method for controlling the electronically slip-controllable power braking system as recited in claim 6, wherein the predefined temperature value is 0° C.

16. An electronically slip-controllable power braking system, comprising:
a brake circuit; and
a pressure generator for applying a circuit pressure to the brake circuit, the pressure generator including a plunger piston, which delimits a pressure chamber changeable in volume and is drivable by a drive unit activatable by an electronic control unit of the power braking system at a forward speed into a forward movement, during which the plunger piston displaces pressure medium out of the pressure chamber into the brake circuit or at a reverse speed into a reverse movement oriented opposite to the forward movement, during which pressure medium flows via a flow path out of a reservoir of the power braking system into the pressure chamber of the pressure generator;
wherein:
the electronic control unit of the power braking system is configured to adapt the reverse speed of the plunger piston; and
at least one of the following:
(a) the electronic control unit is configured to determine a current atmospheric pressure, determine a current pressure in the pressure chamber, and determine a difference between the determined current atmospheric pressure and the determined current pressure in the pressure chamber, and the adaptation is performed based on the determined difference; and
(b) the adaptation includes:
determining, by the electronic control unit, a temperature;
selecting, by the electronic control unit and based on the determined temperature, a maximum value for the reverse speed, the selecting being performed in a manner by which:
(i) above a predefined temperature value, differences in the determined temperature do not cause a change to the selected maximum value;
(ii) within a first temperature range that extends negatively from the predefined temperature value, a reduction in the determined temperature causes a corresponding reduction to the selected maximum value at a first constant rate; and
(iii) a reduction of the detected temperature within a second temperature range, which is below the first temperature range, causes a corresponding reduction to the selected maximum value at a second constant rate, the second constant rate being greater than the first constant rate; and
based on the selecting of the maximum value, controlling, by the electronic control unit, the reverse speed of the plunger piston to remain below the maximum value.

17. The electronically slip-controllable power braking system as recited in claim 16, wherein the adapting includes:
the determining, by the electronic control unit, of the temperature;
the selecting, by the electronic control unit and based on the determined temperature, of the maximum value for the reverse speed, the selecting being performed in the manner by which:
(i) above the predefined temperature value, the differences in the detected temperature do not cause any change to the selected maximum value; and
(ii) within the first temperature range that extends negatively from the predefined temperature value, the reduction in the determined temperature causes the corresponding reduction to the selected maximum value at the first constant rate; and
the controlling, based on the selecting of the maximum value and by the electronic control unit, of the reverse speed of the plunger piston to be below the selected maximum value.

18. The electronically slip-controllable power braking system as recited in claim 17, wherein the predefined temperature value is 0° C.

19. The electronically slip-controllable power braking system as recited in claim 16, wherein the electronic control unit is configured to perform a step of determining a current flow resistance of the flow path, which is from the reservoir to the pressure chamber, and the adaptation is performed by the electronic control unit and as another step that is performed subsequent to the determination of the current flow resistance and based on the determined current flow resistance.

20. The electronically slip-controllable power braking system as recited in claim 16, wherein the electronic control unit is configured to determine the current atmospheric pressure, determine the current pressure in the pressure chamber, and determine the difference between the determined current atmospheric pressure and the determined current pressure in the pressure chamber, and the adaptation is performed based on the determined difference.

* * * * *